United States Patent [19]
Arnett et al.

[11] Patent Number: 6,078,661
[45] Date of Patent: Jun. 20, 2000

[54] MODULAR NETWORK INTERFACE DEVICE

[75] Inventors: Jaime Ray Arnett, Fishers, Ind.; Christopher M. Helmstetter, Bridgewater, N.J.; David Stevens Kerr, Morris Plains, N.J.; Theodore Edward Kluska, Glen Rock, N.J.; Ivan Pawlenko, Holland, Pa.; David Louis Reed, New Palestine; William Tracy Spitz, Indianapolis, both of Ind.; Anthony Robert Tancreto, Brooklyn, N.Y.

[73] Assignee: Lucent Technologies, Inc., Murray Hill, N.J.

[21] Appl. No.: 08/939,330

[22] Filed: Sep. 29, 1997

[51] Int. Cl.$^7$ ..................................................... H04M 9/00
[52] U.S. Cl. ........................... 379/399; 379/412; 379/413
[58] Field of Search ................................... 379/399, 413, 379/412

[56] References Cited

U.S. PATENT DOCUMENTS

| | | | |
|---|---|---|---|
| 4,600,261 | 7/1986 | Debbaut | 439/521 |
| 4,865,564 | 9/1989 | Denkmann et al. | 439/404 |
| 4,903,643 | 2/1990 | Bruhnke | 379/399 |
| 4,945,559 | 7/1990 | Collins et al. | 379/399 |
| 4,949,376 | 8/1990 | Nieves et al. | 379/399 |
| 5,189,697 | 2/1993 | Das | 379/413 |
| 5,363,440 | 11/1994 | Daoud | 379/399 |
| 5,572,348 | 11/1996 | Carlson et al. | 359/125 |
| 5,790,631 | 8/1998 | Minarczik et al. | 379/2 |
| 5,901,220 | 5/1999 | Garver et al. | 379/399 |

OTHER PUBLICATIONS

Specification Sheet, "IDC Pivot Connector: The tool–less solution for signal and low power connections," AMP Inc., Harrisburg, PA, 1997, 2 pages.

Specification Sheet, "Multi–Pair Pivot Connector," AMP Inc., Harrisburg, PA, 1 page.

*Primary Examiner*—Forester W. Isen
*Assistant Examiner*—Brian Tyrone Pendleton
*Attorney, Agent, or Firm*—Ryan & Mason, L.L.P.

[57] ABSTRACT

A network interface device includes a base, a cover and a circuit board secured in the base. The circuit board includes terminations for input and output communication lines. Each pair of input and output communication lines corresponds to a single standard telephone line, a high speed data line or other type of line. The communication line terminations may be implemented as insulation displacement connectors, and the cover may include projections on its inner surface such that closing the cover also closes the insulation displacement connectors on the circuit board. For each communication line, the circuit board may include a subscriber bridge which establishes a breakable connection between the input and output line terminations via traces in the circuit board. In fixed wireless, fiber-to-the-home (FTTH) and other similar applications, the circuit board may also include terminations for input and output power lines, and the base and cover may be extended to accommodate an uninterruptible power supply. The power supply supplies the input power line to the corresponding termination on the circuit board, and the output power line is supplied to a power input of a remote unit in a fixed wireless system or other electronic unit external to the network interface device. The circuit board may also include power protection circuitry for protecting against surges on the input and output communication and power lines.

15 Claims, 12 Drawing Sheets

MODULAR NETWORK INTERFACE DEVICE

RELATED APPLICATIONS

The present application is related to U.S. patent application Ser. No. 08/939,747 of Thelma E. Cole et al., entitled "Network Interface Device with Circuit Board Architecture," and U.S. patent application Ser. No. 08/939,748 of David S. Kerr et al., entitled "Network Interface Device with Automatic Connector Closure," both filed concurrently herewith.

FIELD OF THE INVENTION

This invention relates generally to telecommunications equipment and more particularly to devices which are used to provide an interface between network lines of a service provider and customer premises equipment.

BACKGROUND OF THE INVENTION

A network interface device (NID) installed at a home or business serves as an interface between a service provider network and the telephones, facsimile machines and other customer premises equipment within the home or business. The NID generally includes a customer-accessible bridge which connects the customer premises equipment to the network via the service provider communication lines. The NID also typically provides termination points for the communication lines from the customer and the service provider, as well as electrical protection in accordance with applicable code requirements.

In conventional NIDs, the discrete bridges, terminations, electrical protection units and other internal components are usually wired together manually by either the manufacturer or installer. This unduly increases the complexity and cost associated with manufacturing, installing, servicing and replacing the NID, while also significantly reducing its reliability. In addition, the conventional manually-wired NID is difficult to adapt to variations in customer line requirements. For example, it is a labor-intensive process to add or remove individual line interfaces from an existing conventional NID. As a result, it may be necessary to replace an otherwise workable NID simply because the customer requirements change. Furthermore, the conventional NID architecture is not readily adaptable for use in increasingly important applications such as fixed wireless installations, fiber-to-the-home (FTTH) and other types of broadband, high speed data access applications.

A need therefore exists for an improved NID which avoids the problems associated with conventional manually-wired NIDs and has a flexible architecture which can accommodate the line requirements of fixed wireless installations, high speed data and other important applications.

SUMMARY OF THE INVENTION

An improved NID in accordance with an exemplary embodiment of the invention includes a base, a cover attached to the base, and a circuit board secured within the base. The circuit board includes terminations for input and output communication lines. The terminations may be implemented as insulation displacement connecting devices, binding posts, screw terminals or other suitable connectors mounted on the circuit board. Each pair of input and output communication lines corresponds to a single standard telephone line, high speed data line or other type of line. A given input line supplied from a service provider network is connected to an input line termination on the circuit board, while the corresponding output line termination is connected to customer premises wiring. The circuit board also provides a subscriber bridge between a given set of input and output line terminations. The bridge may include a jack and a corresponding plug connected between the given input and output line terminations, such that inserting the plug in the jack establishes a connection between the input and output line terminations via traces in the circuit board. The bridge is accessible when the cover is in a closed position through an access door in the cover, such that the plug can be disconnected from the jack for testing the communication line. Other types of bridges may also be used, including self-disconnecting jacks. The incorporation of input and output line terminations and the bridge onto a single circuit board considerably simplifies manufacturing, installation and servicing of the NID, while increasing both reliability and flexibility.

In a NID configured for use in a fixed wireless installation, the circuit board may also include terminations for input and output power lines. Like the communication line terminations, the power line terminations may also be implemented using insulation displacement connecting devices, binding posts or other suitable connectors. An input power line from a power supply is connected to an input power line termination on the circuit board, and a connection is established through traces of the circuit board to the corresponding output power line termination. An output power line connected to this termination may be delivered to a remote unit of a wireless system. In accordance with the invention, the base and cover of the NID may be extended to define an additional compartment, adjacent the circuit board, for holding the power supply. The circuit board may further include power protection circuitry for protecting the input and output power lines. This power protection circuitry can be connected between the input and output power line terminations via traces in the circuit board. Similar embodiments may be used in fiber-to-the-home (FTTH) applications as well as any other application which requires connections between a power line termination within the NID and a power line input of an external electronic unit. Other alternative embodiments may incorporate a power supply into the NID itself, such that connections between the power supply and power line terminations on the circuit board may be established through traces in the circuit board.

Another aspect of the invention relates to ensuring proper contacts at the internal terminations of the NID. In accordance with this aspect of the invention, an inner surface of the NID cover may include projections corresponding to the terminations, such that closing the cover automatically applies pressure to the terminations and ensures a reliable contact at each termination. Embodiments of the invention which utilize insulation displacement connecting devices or any other termination in which a contact with a wire is made by applying pressure to the termination may make use of this aspect of the invention.

A NID in accordance with the invention may also be configured such that the base accommodates a number of distinct modules, each including input and output terminations for a given communication line. Each of the modules may be implemented as a circuit board or in the form of a lead frame module, and each may support a different type of communication line. For example, a modular NID of this type may include a first module including input and output terminations, a subscriber bridge and power protection for a standard telephone line, and one or more additional modules containing similar components for high speed data lines as well as other types of lines. This modular arrangement makes it very easy to upgrade or otherwise alter the characteristics of the NID in accordance with changing customer requirements, without replacing or substantially rewiring the existing NID. One or more of the modules may include input and output power line terminations, as well as corresponding power protection circuitry, for use in fixed wireless, FTTH and other applications. Like the other embodiments of the invention, the modules of the modular NID may make use of insulation displacement connecting devices, binding posts or other suitable connectors.

The power protection circuitry of a NID configured for use in a fixed wireless or FTTH application may include a series circuit connected between a first power line and a second power line. The series circuit may be arranged as a series connection of a first fuse, a first varistor, a second varistor and a second fuse, with the interconnection of the first and second varistor in the series connection also connected to ground. This arrangement ensures that either or both of the varistors can be effectively disconnected in the event of overheating or other type of failure, without entirely disconnecting power to the remote unit of the fixed wireless system. As a result, emergency calls can be made even in the event of a varistor failure. The power line terminations may be mounted on a circuit board secured to the base of the NID, such that the power protection circuitry is connected between the input and output power line terminations via traces in the circuit board.

The invention eliminates many of the problems associated with conventional manually-wired NIDs, ensures more reliable connections, and provides sufficient implementation flexibility to accommodate fixed wireless, FTTH and a wide variety of other important applications. These and other features and advantages of the present invention will become more apparent from the accompanying drawings and the following detailed description.

DETAILED DESCRIPTION

The present invention will be illustrated herein using exemplary network interface devices (NIDs) which support standard telephone lines. It should be understood, however, that the invention is suitable for use with a wide variety of other types of communication lines, including but not limited to twisted pairs, coaxial lines, broadband lines including optical fiber lines, Category 5 and other high speed data lines, interactive signal lines and power lines for fixed wireless installations, fiber-to-the-home (FTTH) and other applications. The term "communication line" as used herein should be understood to include a telephony line, a video line, a data line or any other type of signal line including an interactive signal line. In addition, although the circuit board terminations are illustrated herein primarily as insulation displacement connectors (IDCs) or binding posts, other suitable board terminations may be used, including screw terminals and other types of terminal blocks or splice connectors. The term "base" is used generally herein to describe the portion of a NID housing in which a circuit board, module or lead frame is mounted, while the term "cover" refers to the portion of the housing which serves to cover at least part of the base when the NID is closed. Although the exemplary NID embodiments described herein are configured such that the base may be mounted to a wall or other surface, other embodiments could be configured in which the cover is mounted to a surface and the base swings open to expose the internal NID components. The terms "base" and "cover" should therefore not be construed as requiring a particular mounting arrangement for the NID, or a particular relative size and shape of these elements.

Figure 1:
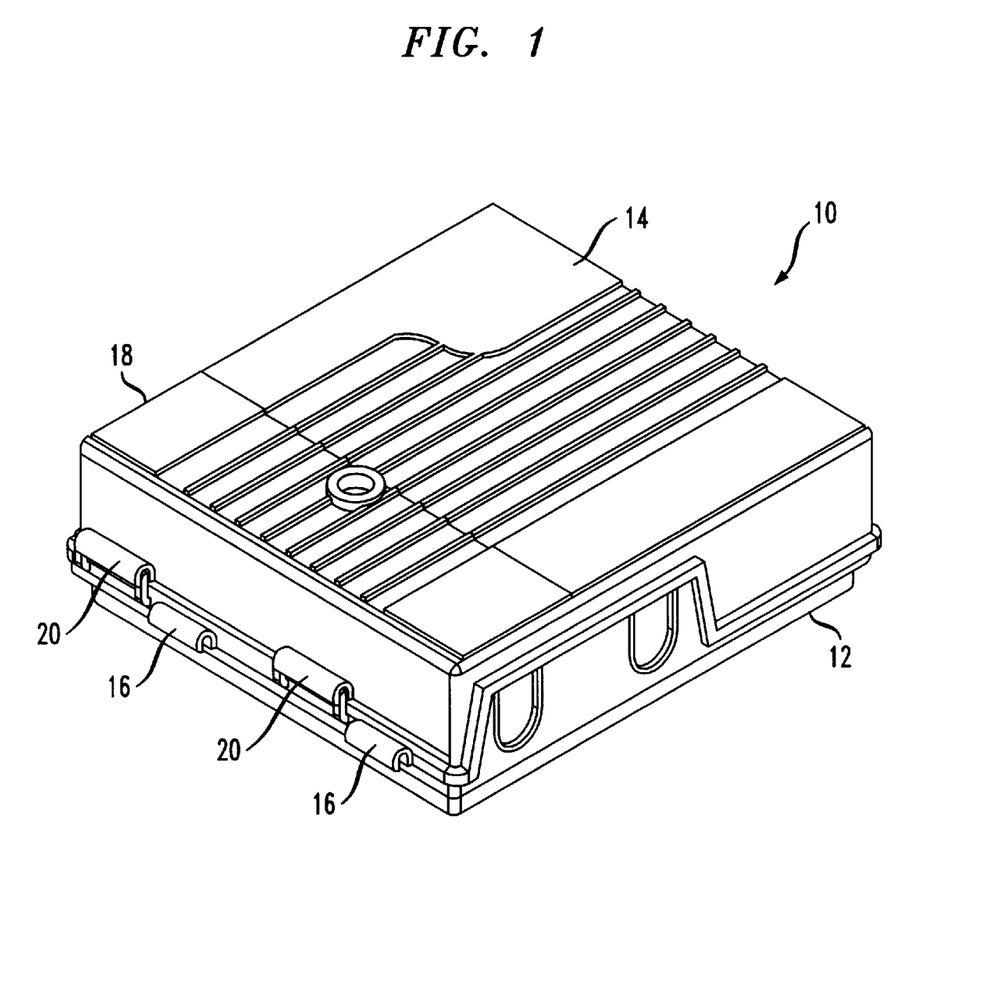
FIG. 1 shows an exemplary network interface device (NID) in accordance with one embodiment of the invention.

FIG. 1 shows a NID 10 in accordance with an illustrative embodiment of the invention. The NID 10 includes a base 12 and a cover 14. The cover 14 is attached to the base 12 by hinges 16. A customer access door 18 is attached to the cover 14 by hinges 20. The NID 10 can be mounted on a wall or other suitable indoor or outdoor location at a home, business or other customer premises. The customer access door 18 is configured to provide customer access to, for example, internal RJ11 jacks or other similar customer-serviceable internal connections, as will be illustrated in conjunction with FIG. 3. The NID cover 14 is typically configured to be opened only by an installer or other technician, and therefore provides access to all internal connections and components, as will be illustrated in conjunction with FIG. 4.

Figure 2:
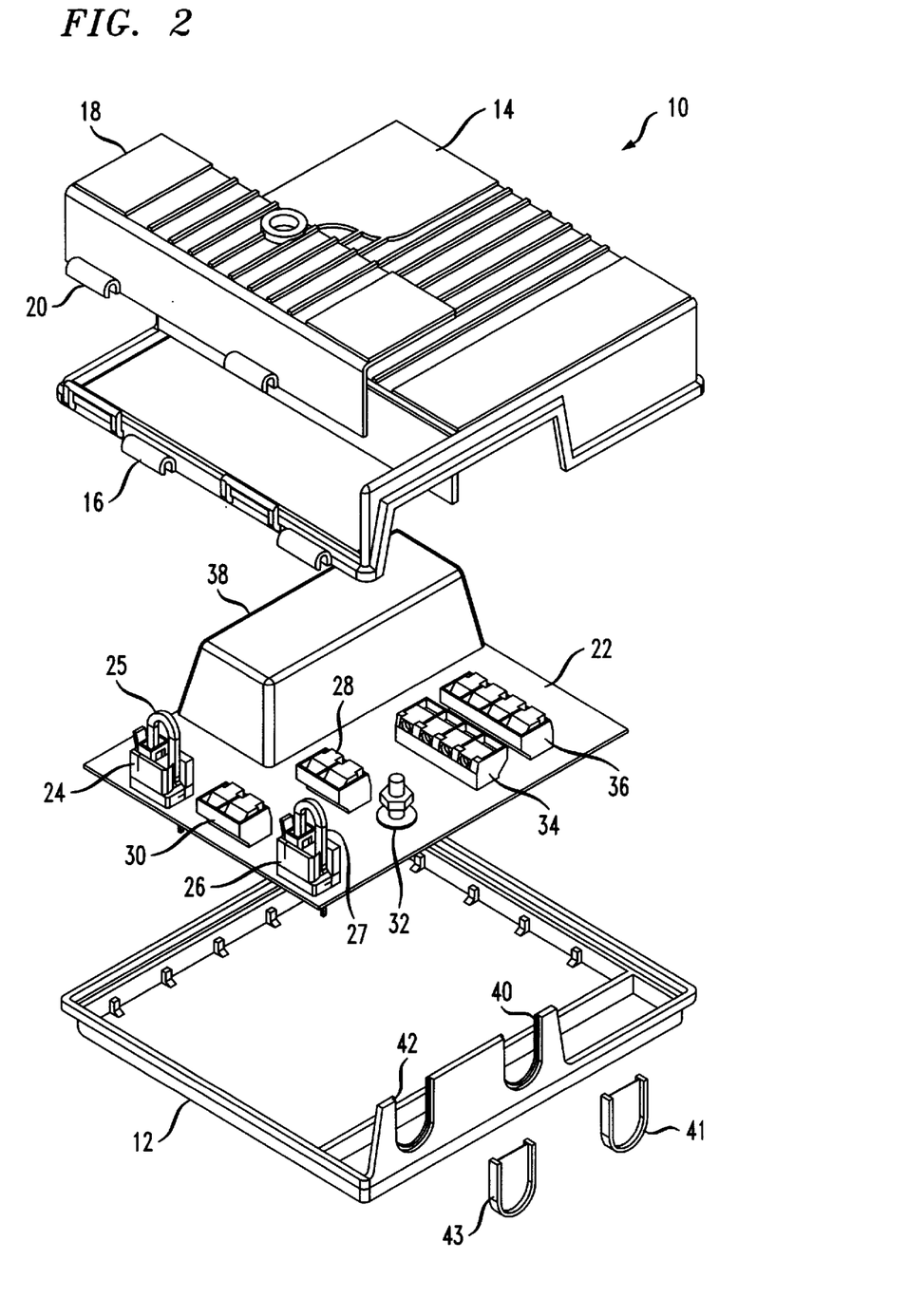
FIG. 2 is an exploded view of the exemplary NID of FIG. 1.

FIG. 2 is an exploded view illustrating the internal components of the NID 10 of FIG. 1. The NID 10 includes a printed circuit board 22 which is mounted or otherwise secured into the base 12. The circuit board 22 includes a first RJ11 jack 24 with a corresponding plug 25, and a second RJ11 jack 26 with a corresponding plug 27. The jacks 24, 26 and plugs 25, 27 provide a subscriber bridge which is accessible to the customer through the customer access door 18. In the event of a communication line failure, the customer can be instructed by the service provider to disconnect one or both of the plugs 25, 27 from the jacks 24, 26 in order to isolate the failure to either the customer premises equipment or the service provider network. Alternative embodiments may implement the above-described bridge using a self-disconnecting RJ11 jack. This type of jack connects the customer and network lines using spring contacts. When the customer inserts a plug into the jack to test the network line, the spring is opened and disconnects the customer line while allowing the inserted plug to contact the network line. Other alternative bridge arrangements which permit disconnection of customer lines, so that network lines may be tested at the NID, may also be used.

The circuit board 22 also includes a set of input line connectors 28, a set of output line connectors 30 and a ground terminal 32. The sets of connectors 28, 30 are each configured in this embodiment to include two insulation displacement connectors (IDCs), one for a tip wire (T) and the other for a ring wire (R) of a single standard telephone line. The input IDC connectors 28 are connected to tip and ring wires from the service provider network, while the output IDC connectors 30 are connected to tip and ring wires of a customer premises telephone line. A connection of a given wire to an IDC connector involves inserting the wire into a wire entry opening in the IDC connector with an upper portion of the connector raised, and then depressing the upper portion. Depressing the upper portion causes the wire insulation to be displaced and securely connects the underlying conductor of the wire to an internal contact. The input and output IDC connectors may be of the type commercially available from AMP Inc. of Harrisburg, Pa. The use of IDCs simplifies installation and servicing of the NID 10 by eliminating the manual wire stripping and terminating operations typically required in conventional NIDs.

The exemplary NID 10, although suitable for use with standard telephony installations, may also be configured to operate with a "fixed" wireless installation. In a fixed wireless installation, the NID 10 interfaces between a remote unit of a wireless telephone system and the telephone lines of the customer premises. The remote unit, which is considered part of the service provider network, is installed in a fixed position at the customer premises and communicates over wireless signal channels with base stations of the wireless system. This allows a customer to place calls over the wireless system using the standard wired telephone equipment within the customer premises. The telephone line wires from the remote unit are connected to the input line connectors 28 on circuit board 22, and the telephone line wires of the customer premises are connected to the output line connectors 30. The NID 10 also receives input power lines from an uninterruptible power supply (UPS) within the customer premises and provides connections for the input power lines so as to deliver power via output power lines to the remote unit of the wireless system. The circuit board 22 of NID 10 includes a first set of power connectors 34 and a second set of power connectors 36. Each of the sets of connectors 34, 36 includes four separate single-wire IDCs, numbered 1 through 4. The single-wire IDCs may be used for either input or output connections. In one possible embodiment, the first set of connectors 34 may be connected to output power line wires from the customer premises power supply, while the second set of connectors 36 are connected to input power line wires of the remote unit. Numerous other configurations of the input and output power lines may also be used.

The exemplary NID 10 also incorporates power protection circuitry for protecting against current surges, overvoltage or other undesirable conditions on the input and output power lines. The power protection circuitry is arranged in this embodiment on a portion of the circuit board 22 beneath a cover 38. The operation and arrangement of these power protection components will be described in greater detail below in conjunction with FIGS. 5, 6 and 7. The input and output telephone line and power line wires enter or exit the NID 10 through openings 40, 42 in the base 12. The openings 40, 42 may include corresponding grommets 41, 43.

Figure 3:
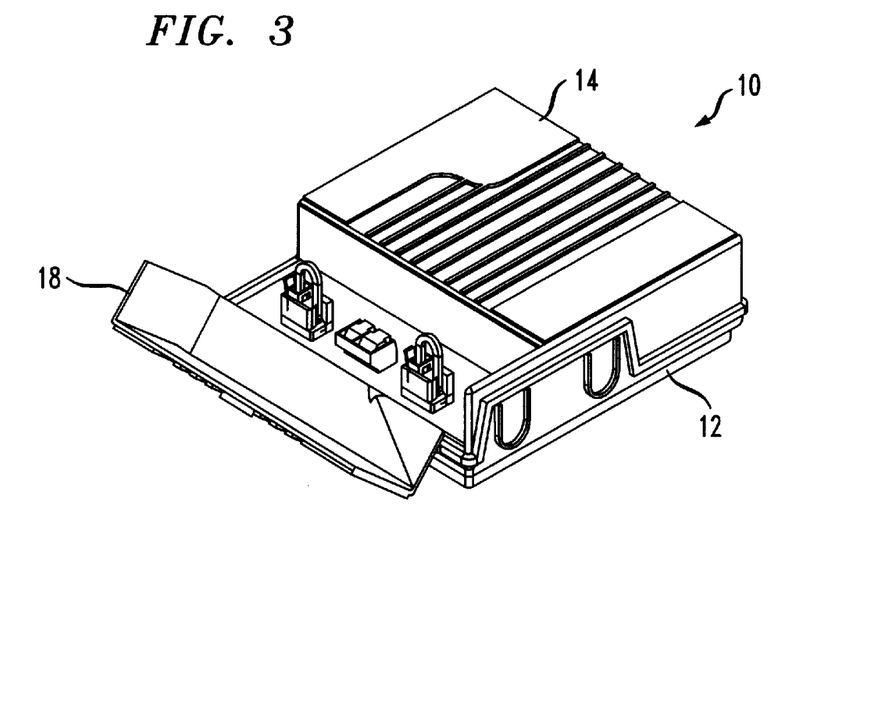
FIG. 3 is a view of the NID of FIG. 1 with the customer access door opened.
Figure 4:
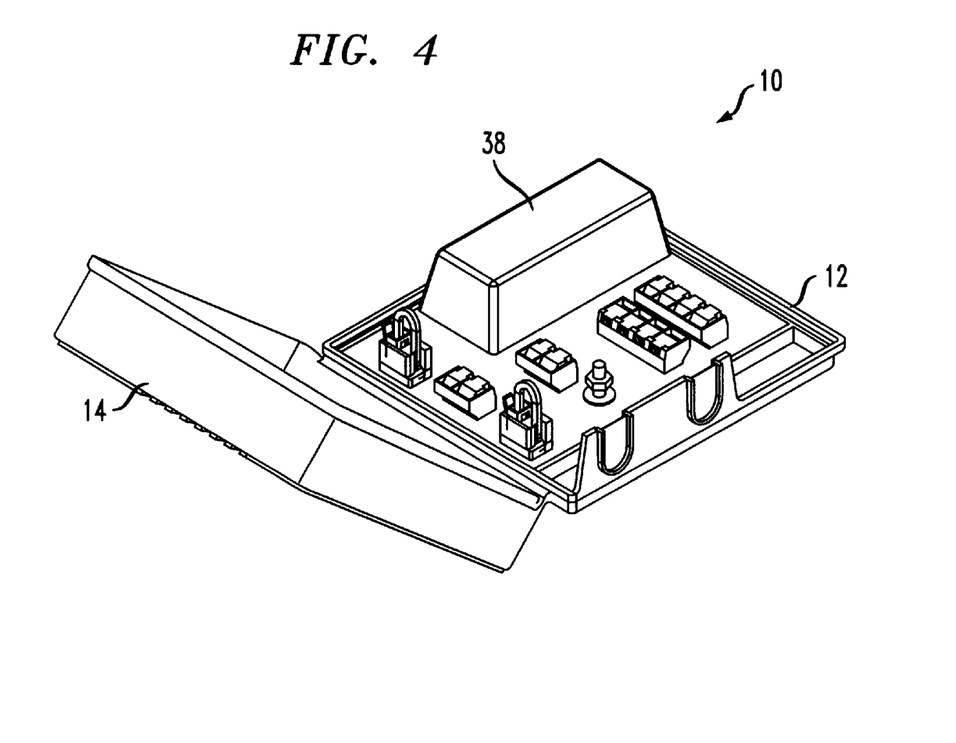
FIG. 4 is a view of the NID of FIG. 1 with the NID cover opened.

FIG. 3 shows the NID 10 with the customer access door 18 in an open position. It can be seen that the customer access door 18 in this embodiment allows the customer to access the RJ11 jacks 24, 26 and the corresponding plugs 25, 27. As previously noted, this provides the customer with the ability to isolate failures to either the customer premises equipment or the service provider network. FIG. 4 shows the NID 10 with the NID cover 14 in an open position. In this position, all internal components and connections are easily accessible. The power protection components beneath cover 38 may be accessed when the NID cover 14 is opened by simply removing the cover 38. In many applications, it may be desirable for the NID cover 14 and base 12 to incorporate a locking mechanism which will prevent the NID cover 14 from being opened by unauthorized individuals.

Figure 5:
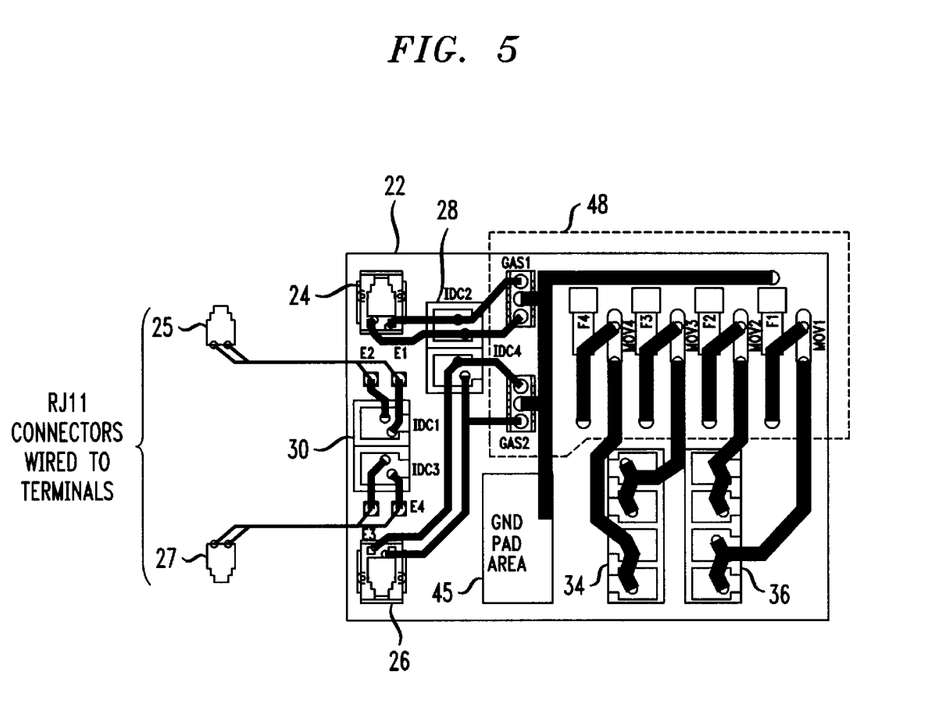
FIG. 5 shows an exemplary printed circuit board suitable for use in the NID of FIG. 1.

FIG. 5 shows an illustrative embodiment of the circuit board 22 in greater detail. The circuit board 22 includes the RJ11 jacks 24, 26 and the corresponding plugs 25, 27, the input and output line connectors 28, 30, and the first and second sets of power line connectors 34, 36, all arranged as previously described in conjunction with FIG. 2. The traces on the circuit board 22 are shown as solid dark lines. The circuit board 22 includes a ground pad area 45 which is provides a contact with the ground terminal 32, and a set of protection circuitry 48. The set of input connectors 28 include IDCs designated IDC2 and IDC4, while the set of output connectors 30 include IDCs designated IDC1 and IDC3. The tip and ring contacts of the RJ11 jack 24 are connected via traces on board 22 to the tip and ring contacts of the input connector IDC2, while the tip and ring contacts of the RJ11 jack 26 are connected via traces on board 22 to the tip and ring contacts of the input connector IDC4. The tip and ring wires of the plug 25 are wired to terminals E1 and E2 of the board 22, and are connected via traces on board 22 to the corresponding tip and ring contacts of the input connector IDC1. Similarly, the tip and ring wires of the plug 27 are wired to terminals E3 and E4 of board 22, and are connected via traces to the corresponding tip and ring contacts of the input connector IDC3. When the plugs 25, 27 are plugged into the corresponding jacks 24, 26, the service provider telephone line wires at input connectors 28 are connected to the customer premises telephone line wires at output connectors 30. It should be noted that the use of a circuit board of the type illustrated in FIG. 5 provides considerable flexibility in terms of the connections which can be established within the NID. Connections which would be very difficult to wire into a conventional NID can be easily accommodated through the use of appropriate circuit board traces.

The protection circuitry 48 on circuit board 22 in this embodiment includes a pair of gas discharge tubes (GDTs) designated GAS1 and GAS2, one for each of the two standard telephone lines in the NID 10. The GDTs are conventional three-terminal devices which are designed to divert surges on the tip and ring wires to ground. The central terminals of both GAS1 and GAS2 are connected via a trace on the board 22 to the ground pad area 45. The other two terminals of GAS1 are connected via traces on board 22 to the tip and ring contacts of IDC2 and thereby to the tip and ring terminals of the RJ11 jack 24. Similarly, the other two terminals of GAS2 are connected via traces on board 22 to the tip and ring contacts of IDC4 and thereby to the tip and ring terminals of the RJ11 jack 26. The protection circuitry 48 may incorporate other conventional protection for the tip and ring wires, such as a thermal overload mechanism which shorts the tip and ring wires to ground in the event of a sustained surge in order to prevent fire hazards, or a back-up gap which provides protection if a GDT loses gas.

The protection circuitry 48 also includes power line protection for the input and output power lines in NID 10.

Figure 6:
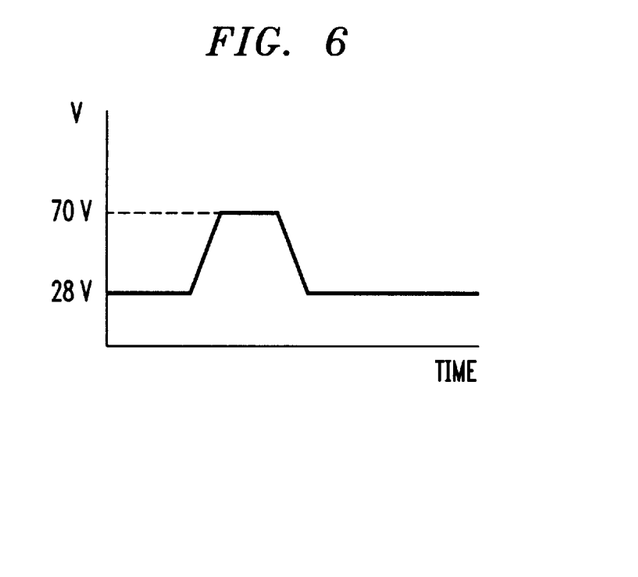
FIG. 6 shows the response of an MOV element on the circuit board of FIG. 5.

This power line protection is implemented in the illustrative embodiment of FIG. 5 using four series fuses designated F1, F2, F3 and F4 and four metal oxide varistors (MOVs) designated MOV1, MOV2, MOV3 and MOV4. The MOVs clamp voltage surges on the power lines to acceptable levels, while the fuses in this embodiment are arranged to stop the flow of current to the MOVs in the event of MOV overheating. Additional fuses, which are not shown in FIG. 5, may be included to protect against current surges on the power lines. FIG. 6 shows an exemplary MOV voltage characteristic as a function of time in the presence of a voltage surge. The MOV clamps the power line voltage during the surge to 70 volts. After the surge, the power line voltage returns to the normal pre-surge level of 28 volts. The power line wires connected to input and output power line connectors 34, 36 are connected as shown via traces on the board 22 to the fuses and MOVs.

Figure 7:
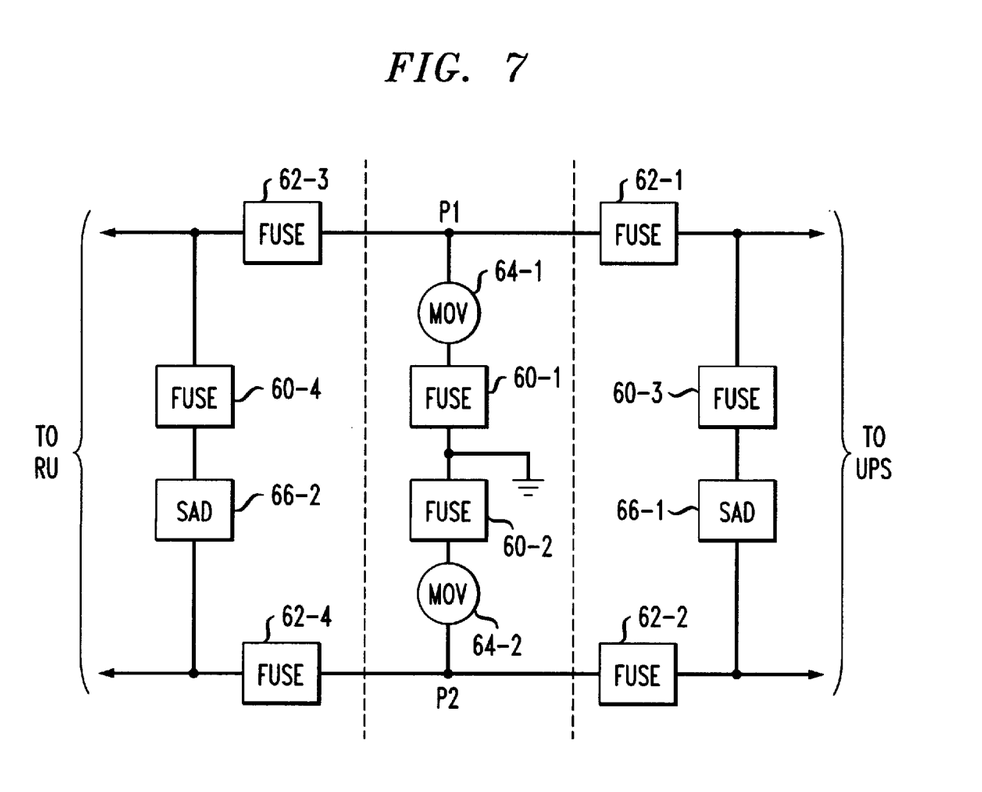
FIG. 7 is a schematic of an improved electrical protection circuit for use in a NID in accordance with the invention.

FIG. 7 is a schematic illustrating an alternative arrangement of the fuses and MOVs which may be used in the protection circuitry 48 of FIG. 5. In this arrangement, power lines P1 and P2 are connected from a UPS through the protection circuitry of the NID to power supply inputs of the above-noted remote unit (RU) of a wireless system. An MOV 64-1, fuses 60-1 and 60-2, and an MOV 64-2 are connected in series between the lines P1 and P2 as shown. Fuses 60-1 and 60-2 are connected to ground at their interconnection, and may be implemented as standard current-sensitive fuses or temperature sensitive fuses such as thermal-cutoff fuses or positive temperature coefficient (PTC) devices. Fuses 62-1, 62-3 and 62-2, 62-4 are connected in series in the respective power lines P1 and P2 as shown. In an alternative embodiment, the positions of the fuses 60-1, 60-2 and the MOVs 64-1, 64-2 may be interchanged, such that fuses 60-1 and 60-2 are connected between respective power lines P1 and P2 and respective MOVs 64-1 and 64-2, and the MOVs are connected to ground at their interconnection. The fuses 60-1 and 60-2 in either embodiment serve to isolate the respective MOVs 64-1 and 64-2 in the event of MOV overheating, while allowing sufficient power flow via power lines P1 and P2 to permit emergency calls to be made. Conventional power protection circuitry generally includes only series fuses such as 62-1 and 62-2, which serve to shut off the main power connection of lines P1 and P2 in the event of MOV overheating.

The elements 66-1 and 66-2 represent conventional voltage clamp devices, such as silicon avalanche diodes (SADs), and are protected by fuses 60-3 and 60-4, respectively. The elements 66-1 and 66-2 may alternatively be implemented as MOVs. In alternative embodiments of the power protection circuitry of FIG. 7, the elements 60-3, 66-1 and 60-4, 66-2 may be eliminated. The power protection elements 62-1, 62-2, 66-1 and 60-3 may be implemented within the UPS or on the circuit board of the NID. Similarly, the power protection elements 62-3, 62-4, 66-2 and 60-4 may be implemented within the RU or on the circuit board of the NID. It should be noted that the functions of fuses 62-1, 62-2, 62-3 and 62-4 may be implemented in the NID through the use of fuse links. The fuse links may be implemented using a length of wire that exits a cable within the NID and is terminated to the circuit board, or alternatively may be built on the circuit board or designed into circuit board traces.

The NID circuit board architecture of the present invention also simplifies implementation of enhanced communication line protection circuitry. The exemplary embodiment described in conjunction with FIG. 5 utilized three-terminal GDTs, in which input and output lines are tied to the same point, for communication line protection. The use of the circuit board for communication line protection circuitry permits implementation of more sophisticated protectors, such as five-terminal protectors, in which separation of input and output lines allows the insertion of additional components between the input and output lines. These protectors may include the following: (1) current limiting devices, such as fuses or PTC devices which act as resettable fuses, (2) maintenance termination units (MTUs), which are circuits used by service providers for fault sectionalization, (3) additional impedances, which may be in the form of resistors, inductors or PTC devices, that assist in coordinating the generally robust protection in a NID with the weaker secondary protection circuits located in fax machines, modems and the like, and (4) filters for removing radio interference or other signals, as required by a given application. Moreover, the circuit board architecture facilitates the use of solid state protection devices, which may be used in place of or in conjunction with GDTs and MOVs.

Figure 8:
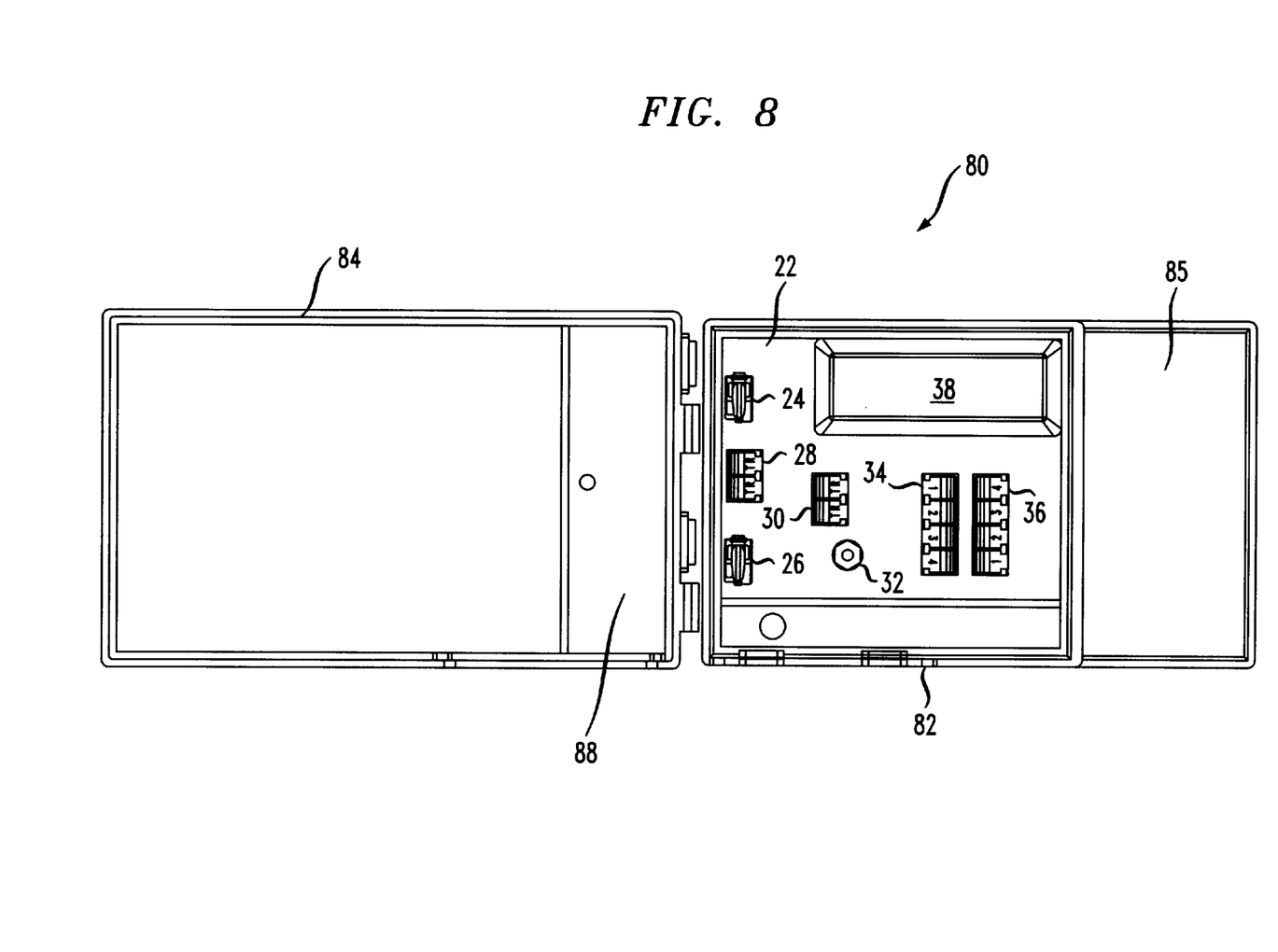
FIG. 8 shows an alternative embodiment of the NID of FIG. 1 in which the NID base and cover are extended to accommodate an uninterruptible power supply (UPS).

FIG. 8 shows a NID 80 in accordance with an alternative embodiment of the invention. The NID 80 includes a base 82, a cover 84 and a customer access door 88, configured in a manner generally similar to that described above in conjunction with the NID 10. The NID 80 also includes the circuit board 22 and its corresponding components as previously described. The base 82 and cover 84 of the NID 80 are both extended in this embodiment to provide an additional compartment 85 which is designed to accommodate the above-noted UPS. The UPS in the NID 80 may be completely separate from the circuit board 22, or partially or completely implemented on a portion of the circuit board 22 which extends into the compartment 85. Connections between the UPS and the NID circuit board may therefore be established through traces in the circuit board. The compartment 85 may be completely enclosed or only partially enclosed. The power supply may be accessible through a separate access door having a separate lock or other security device.

Conventional NIDs, which are typically designed for use in wired systems, generally do not include a UPS because all the required power is supplied over the wired telephone lines. However, a NID suitable for use in a fixed wireless installation can benefit greatly from incorporation of a UPS. As noted above, the power lines in the NID 10 are supplied from a UPS which is external to the NID 10. The NID 80 is configured to permit the incorporation of a UPS directly into the NID itself, thereby further simplifying the power line interconnections. The UPS within the NID 80 may utilize AC power from the customer premises. The UPS will typically include a DC power source driven by the customer AC power, as well as a suitable battery backup for supplying DC power in the event of AC power source failure. Conventional NIDs have apparently not heretofore incorporated a UPS into the NID itself. This feature of the invention can provide significant reductions in installation wiring requirements, in that all UPS power line connections to the NID can be incorporated during NID manufacture.

Figure 9:
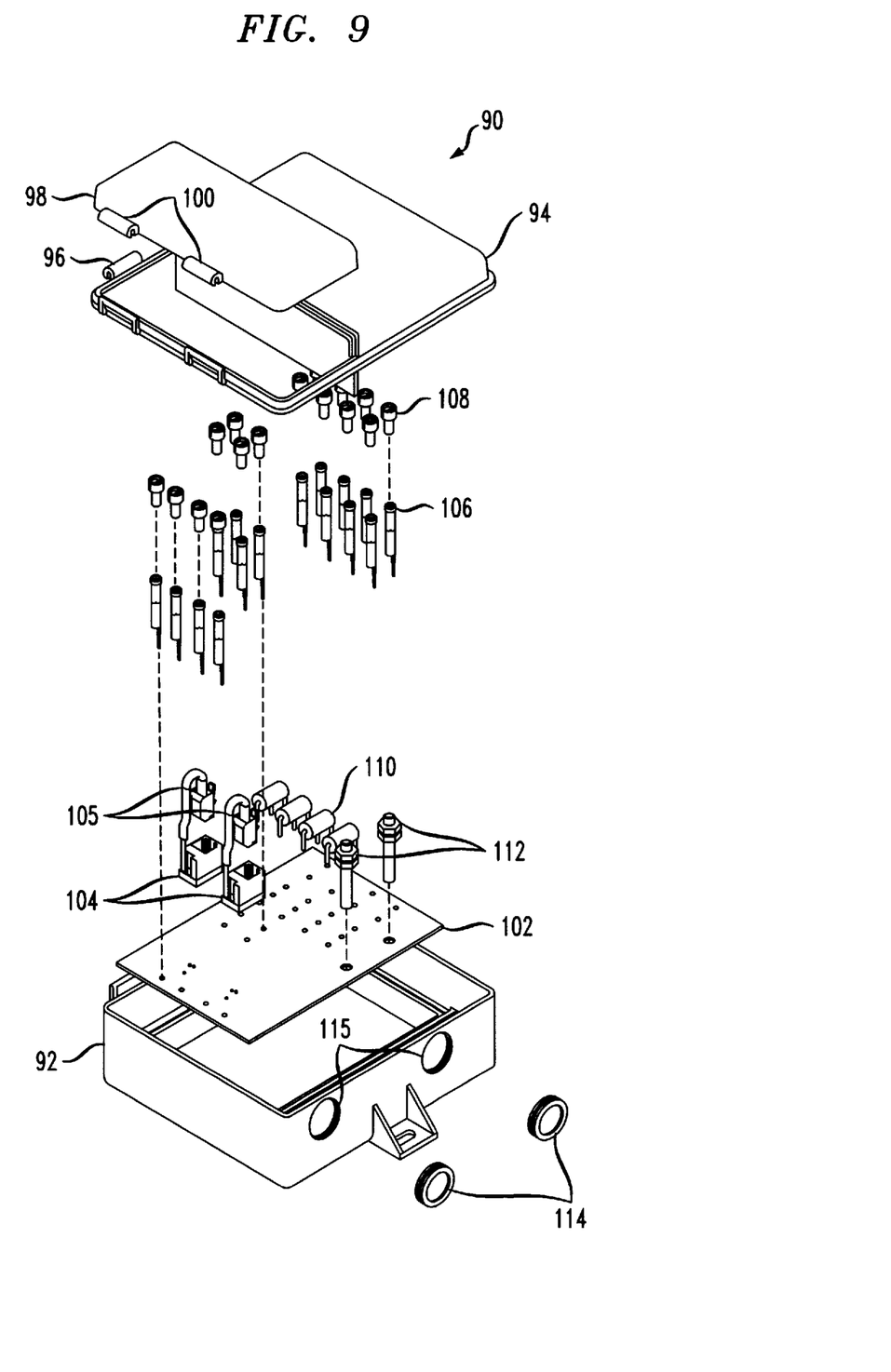
FIG. 9 is an exploded view of another exemplary NID in accordance with the invention.

FIG. 9 shows a NID 90 in accordance with another alternative embodiment of the invention. Like the NID 10, the NID 90 includes a base 92, a cover 94 and a customer access door 98. The cover 94 in this embodiment is arranged to open using hinges 96, while the customer access door is arranged to open using hinges 100. The cover 94 thus opens in a direction substantially perpendicular to that of the access door 98, in contrast to the NID 10 in which the cover opened in a direction substantially parallel to that of the access door. The circuit board 102 includes a pair of RJ11 jacks 104 and a corresponding pair of RJ11 plugs 105, arranged to provide the subscriber bridge feature previously described.

The IDCs associated with the input and output line connectors and input and output power connectors in NID 10 are replaced in this embodiment with binding post contacts 106 and corresponding binding post screws 108. The binding post contacts 106 are soldered into the appropriate holes in the circuit board 22. A connection may be made between a stripped wire and a given binding post contact 106 using conventional techniques. Although the binding post connection arrangement of FIG. 9 is more labor intensive at the installation phase than the IDC connector arrangement used in the NID 10, the incorporation of binding posts onto a printed circuit board with other NID components nonetheless facilitates manufacture and installation relative to conventional manually-wired NIDs. The circuit board 102 further includes a pair of ground contacts 112, and four GDTs 110. Each of the GDTs includes three terminals and provides power protection on the tip and ring wires of a telephone line in the manner previously described. Grommets 114 are used to protect wires passing through the openings 115.

Figure 10:
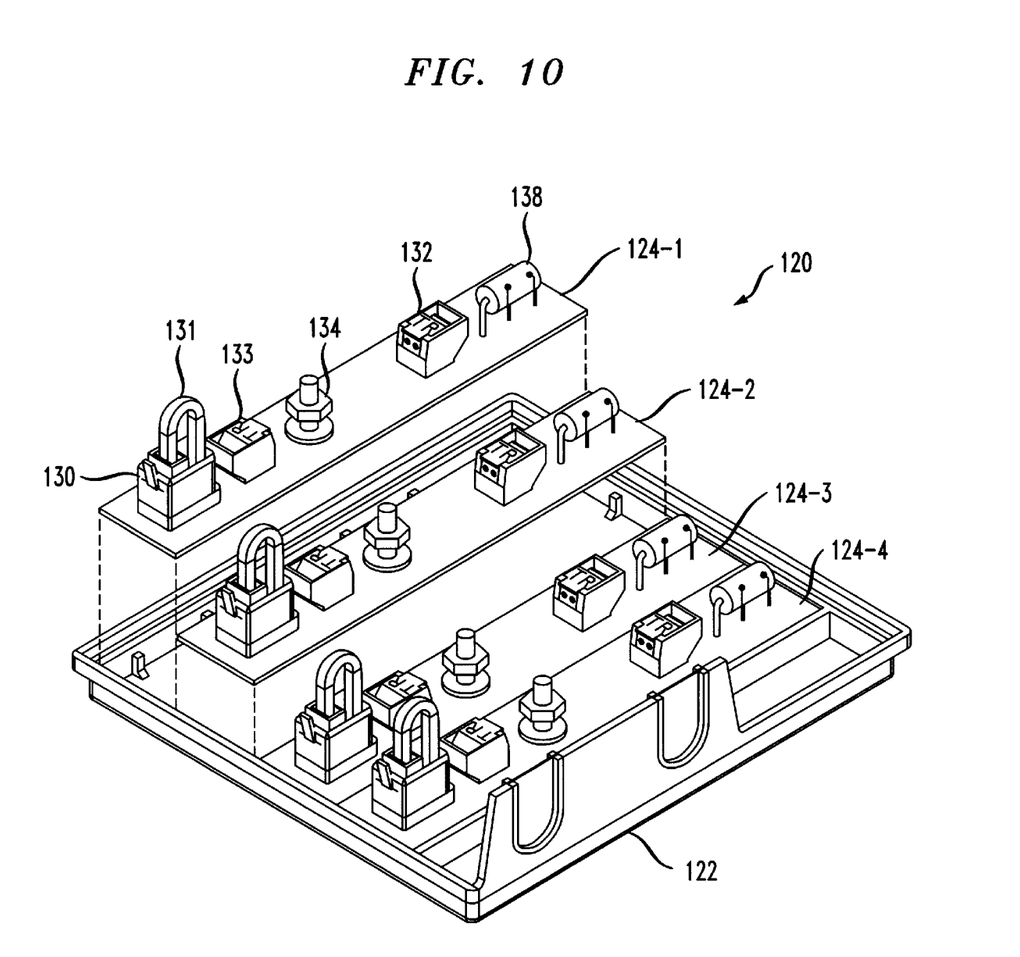
FIG. 10 shows a portion of a NID configured to include a modular arrangement of circuit boards in accordance with the invention.

FIG. 10 shows a portion of a NID 120 and illustrates a modularity feature of the present invention. The NID 120 includes a base 122. The base 122 supports four separate circuit boards, 124-1, 124-2, 124-3 and 124-4. Each of the circuit boards 124-n is used to support a single standard telephone line, and includes an RJ11 jack 130, an RJ11 plug 131, an input line connector 132, an output line connector 133, a ground terminal 134 and a GDT 138 for power protection. The boards 124-n are mounted or otherwise secured within the base 122 using any suitable conventional technique. The RJ11 jack 130 and plug 131 provide the previously-described subscriber bridge feature. The input and output line connectors 132, 133 are implemented as IDCs in this embodiment. The input connector 132 receives tip (T) and ring (R) wires from the service provider network, while the output connector receives tip and ring wires from the customer premises. The interconnections between the components on the boards 124-n are similar to those described previously in conjunction with the circuit board 22 of FIG. 5. Although shown in FIG. 10 as providing standard telephone line functions, the boards 124-n in alternative embodiments can each be designed to provide a different type of service. For example, one or more of the boards 124-n may include fixed wireless power line protection circuitry of the type described in conjunction with FIG. 5.

The NID 120 can be configured to support many different numbers and types of customer lines. For example, the same NID 120 can be used when a customer with one existing line wants to upgrade to three lines, when a customer wants to add a high speed line, or when a customer wants to drop from three lines to two. These and numerous other configuration changes are facilitated by the modular nature of the NID 120. Adding, removing or upgrading a line can be accomplished by simply adding, removing or upgrading a corresponding circuit board 124. This is a considerable improvement over conventional NIDs, which are typically designed to support only certain specific configurations and are therefore highly inflexible. Configuration changes in conventional NIDs often require either replacing the NID itself or manually re-wiring its internal components, both of which are time-consuming and costly operations. The modular NID 120 of FIG. 10 overcomes these problems without unduly increasing the complexity and cost of the NID itself.

Figure 11A:
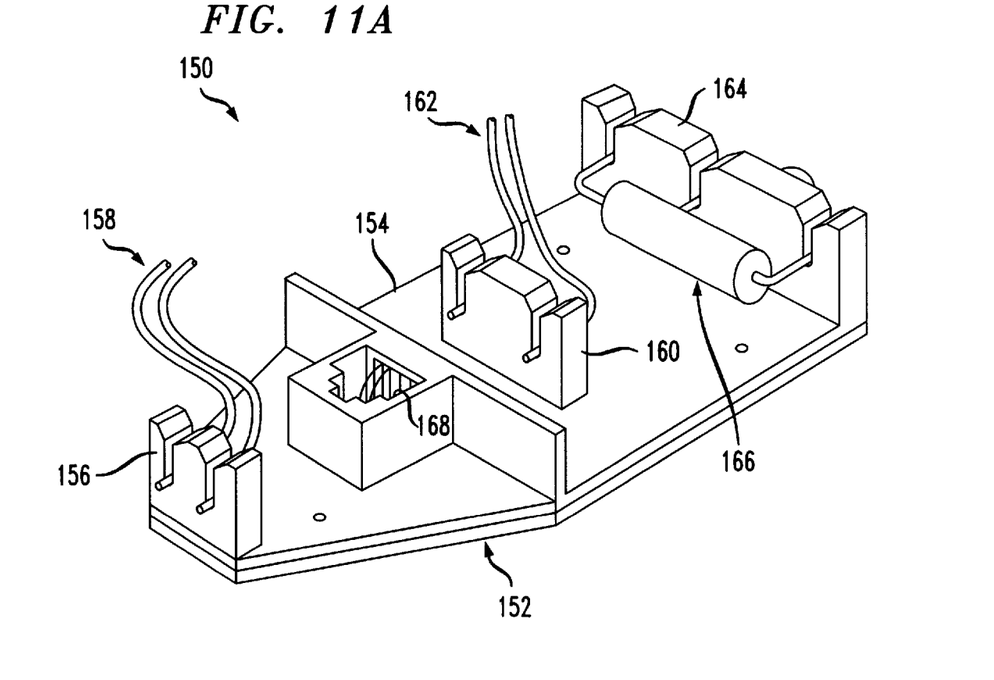
FIGS. 11A–11D illustrate an exemplary lead frame module for use in a modular NID in accordance with the invention.
Figure 11B:
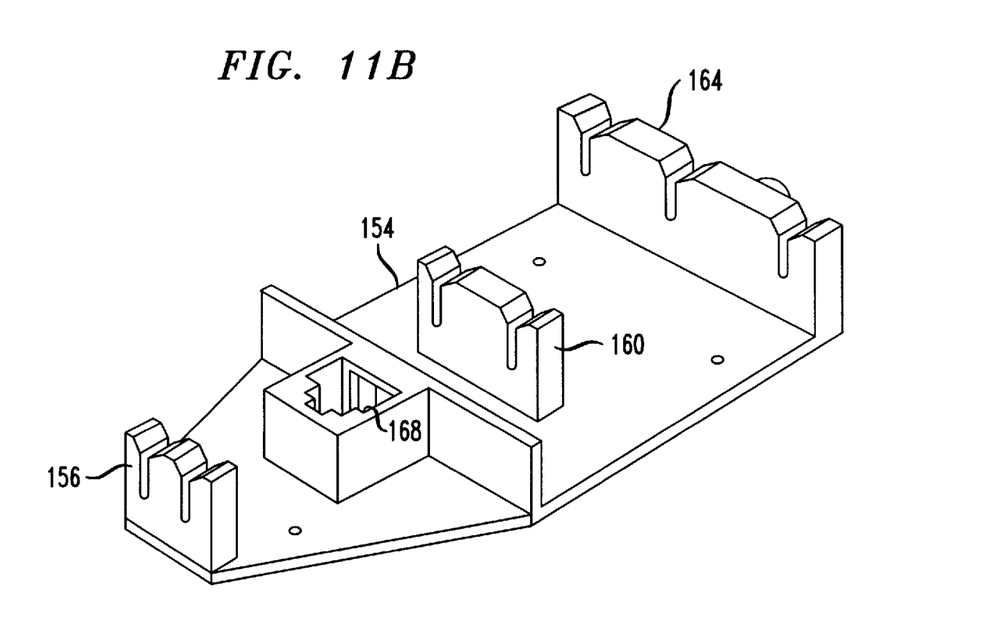
Figure 11C:
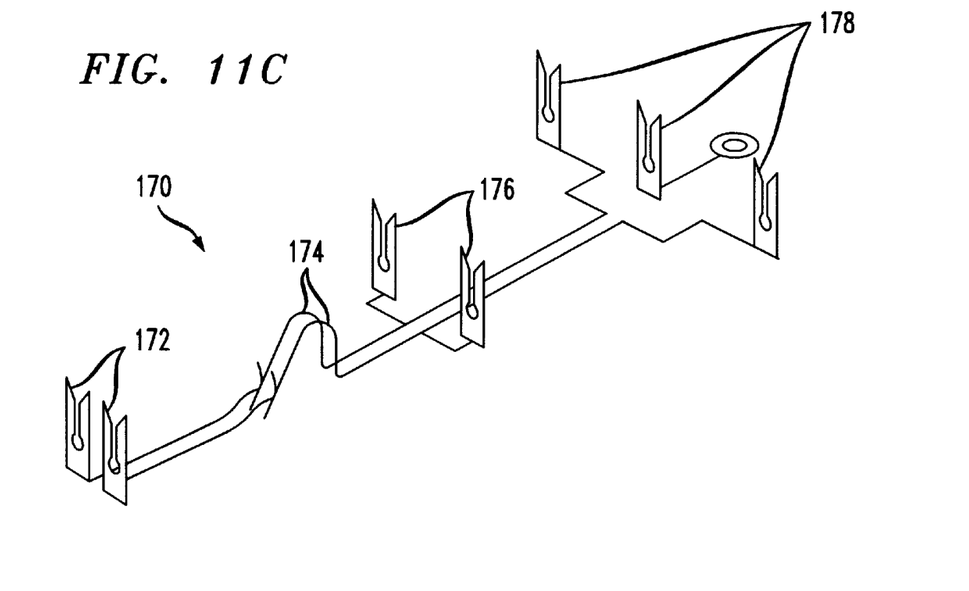
Figure 11D:
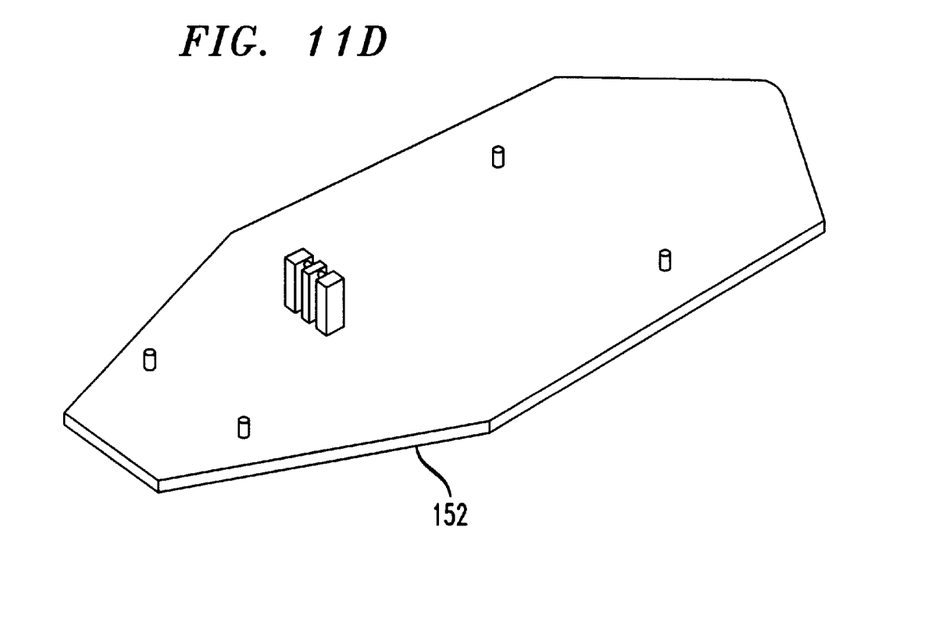

An alternative embodiment of the modular NID 120 may be implemented by replacing the individual circuit boards 124-n with one or more lead frame modules. The lead frame modules incorporate the functionality of the boards 124-n described above, but utilize a lead frame module rather than a printed circuit board to support the components. FIGS. 11A through 11D illustrate an exemplary implementation of a lead frame module 150 suitable for installation with one or more other modules into a modular NID in accordance with the invention. The lead frame module 150 as shown in FIG. 11A includes a lead frame base 152, which is shown separately in FIG. 11D, and a lead frame cover 154 which is shown separately in FIG. 11B. The lead frame cover includes a customer wiring block 156 at which a connection is made between tip and ring wires 158 from the customer premises and the underlying portions of the lead frame, a network wiring block 160 at which a connection is made between tip and ring wires from the service provider and the underlying portions of the lead frame. The lead frame cover also includes a protection block 164 at which a GDT 166 is connected to underlying portions of the lead frame. The jack 168 is a self-disconnecting jack which implements a bridge function as previously described. FIG. 11C shows the lead frame 170 which is supported between the lead frame base 152 and the lead frame cover 154. The portion 172 of the lead frame 170 contacts the customer premises wiring 158 in block 156. The portion 174 of the lead frame 170 can be partially seen within the jack 168 in FIG. 11A and is used to provide the self-disconnecting jack feature. The portion 176 of the lead frame 170 contacts the network wiring in block 160, and the portion 178 contacts the terminals of the GDT 166 in the block 164. The lead frame module 150 incorporates the subscriber bridge, input and output connection and communication line protection functions described previously in connection with the circuit board modules of FIG. 10.

Embodiments of the invention which incorporate IDCs, such as the NID 10 of FIGS. 1 through 4, the NID 80 of FIG. 8 and the NID 120 of FIG. 10, may each incorporate another feature of the invention. In accordance with this feature, the NID cover is configured such that closing the NID cover automatically applies the appropriate pressure to depress the upper portion of each of the IDCs. This ensures that the required connections are established automatically upon closing the NID door, and ensures that a technician cannot close the NID cover while inadvertently leaving an IDC open or only partially closed.

Figure 12A:
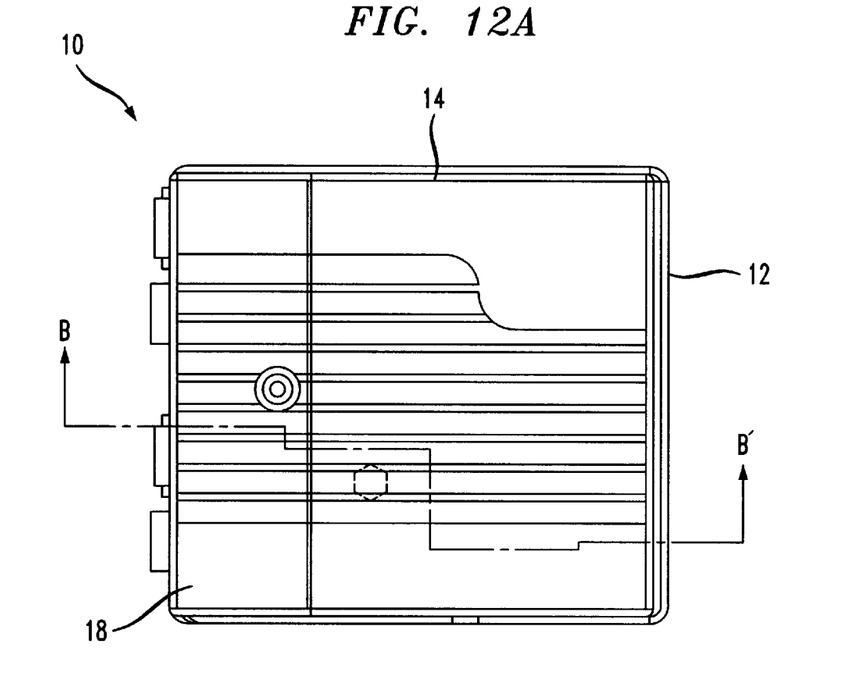
FIGS. 12A–12D illustrate an aspect of the invention in which closing a NID cover automatically ensures proper closure and contact for internal connectors.
Figure 12B:
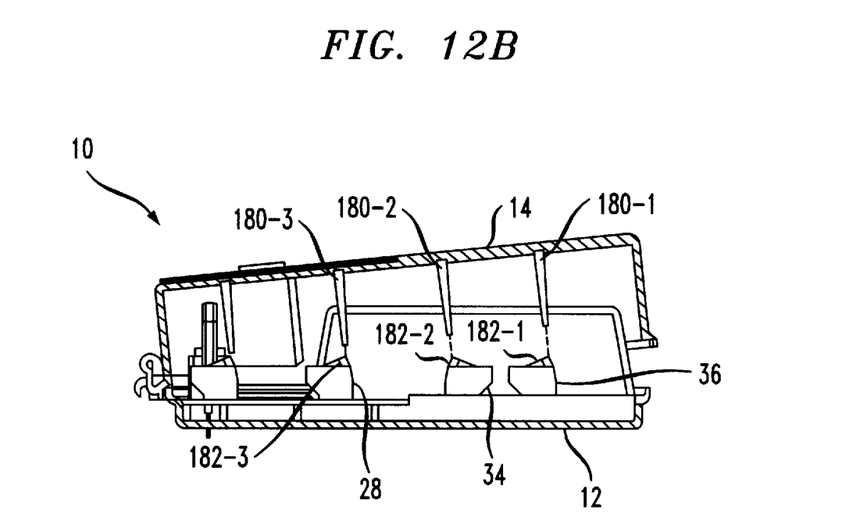
Figure 12C:
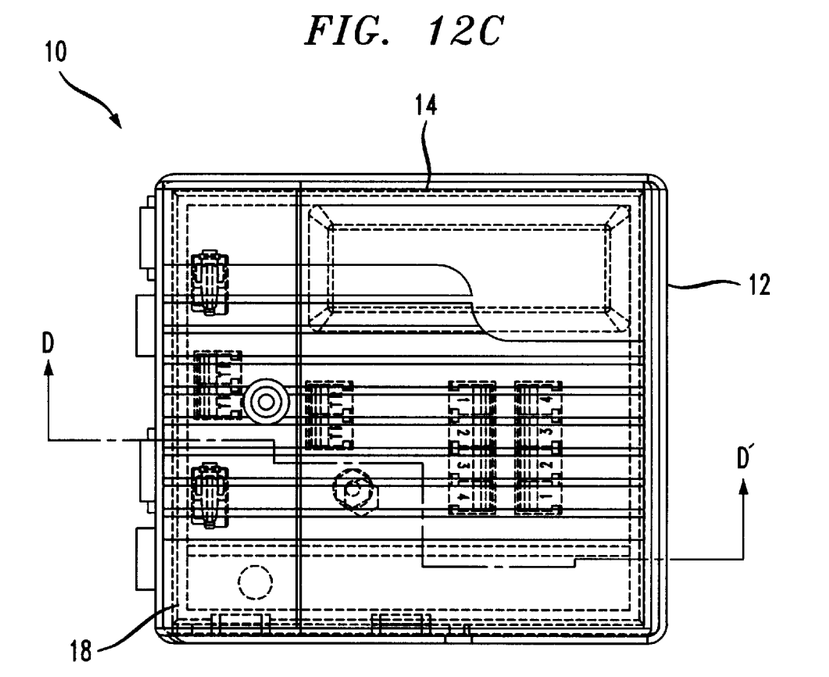
Figure 12D:
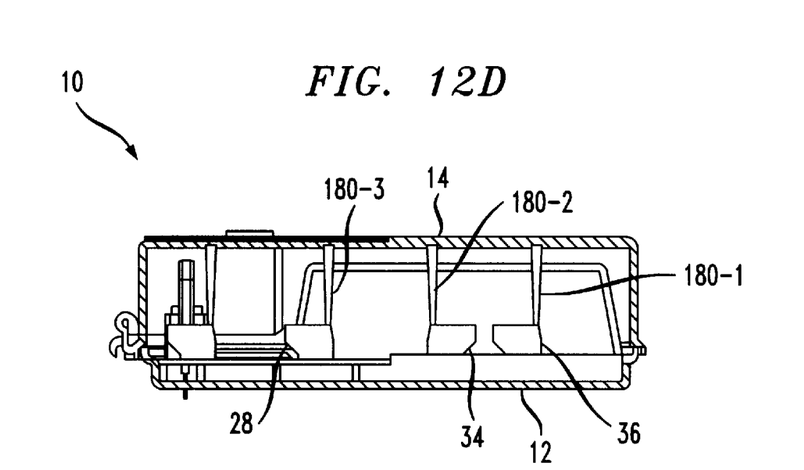

FIGS. 12A–12D illustrate this feature as implemented in the NID 10 of FIGS. 1 through 4. FIGS. 12A and 12B show different views of the NID 10 with the cover 14 in a partially-closed position. It can be seen from FIG. 12B that an inner surface of the cover 14 incorporates a number of projections. These projections include, for example, three projections designated 180-1, 180-2 and 180-3, which correspond generally to the positions of the three sets of IDCs 36, 34 and 28, respectively, as well as other projections corresponding to other IDCs. Closing the NID cover 14 brings the projections 180-1, 180-2 and 180-3 into contact with corresponding upper portions 182-1, 182-2 and 182-3 of the IDCs 36, 34 and 28, respectively, in order to ensure that each IDC is properly closed. FIGS. 12C and 12D show different views of the NID 10 with the cover 14 fully closed. It can be seen from FIG. 12D that the projections 180-1, 180-2 and 180-3 have fully depressed the corresponding upper portions of the IDCs, thereby ensuring a proper contact between the IDCs and the associated wiring. This feature of the invention may be utilized with any other type of connector in which the connection is made by applying pressure to a portion of the connector.

The above-described embodiments of the invention are intended to be illustrative only. Numerous alternative embodiments within the scope of the following claims will be apparent to those skilled in the art.

What is claimed is:

1. A network interface device, comprising:

a base;

a cover attached to the base; and a first module secured within the base, the first module including terminations for at least one input communication line and at least one output communication line, wherein the base is configured to support at least one additional module in an area adjacent the first module, and further wherein at least one of the first and additional modules includes terminations for at least one input power line and at least one output power line.

2. The network interface device of claim 1 wherein the first module and the at least one additional module are implemented as circuit boards.

3. The network interface device of claim 1 wherein the first module and the at least one additional module are implemented as lead frame modules.

4. The network interface device of claim 1 wherein the first module is associated with a communication line of a first type, and the additional module is associated with a communication line of a second type.

5. The network interface device of claim 1 wherein the base is configured to support the first module and a plurality of additional modules, and each module corresponds to a different communication line.

6. The network interface device of claim 1 wherein at least a portion of the communication line terminations of the first module are implemented as insulation displacement connecting devices.

7. The network interface device of claim 1 wherein at least a portion of the communication line terminations of the first module are implemented as binding post contacts.

8. The network interface device of claim 1 wherein the first module includes a subscriber bridge comprising a communication line jack and a corresponding communication line plug connected between the input line termination and output line termination, such that inserting the plug in the jack establishes a connection through the first module between the input line termination and the output line termination.

9. The network interface device of claim 1 wherein the first module includes a subscriber bridge comprising a self-disconnecting jack.

10. The network interface device of claim 1 wherein an extension of the base at least partially defines a compartment for holding a power supply.

11. The network interface device of claim 1 wherein at least a portion of the power line terminations of the first module are implemented as insulation displacement connecting devices.

12. The network interface device of claim 1 wherein at least a portion of the power line terminations of the first module are implemented as binding post contacts.

13. The network interface device of claim 1 wherein the first module further includes power protection circuitry for the input and output power lines.

14. A network interface device, comprising:

a base;

a cover attached to the base; and a first module secured within the base, the first module including terminations for at least one input communication line and at least one output communication line, wherein the base is configured to support at least one additional module in an area adjacent the first module, and further wherein the first module is associated with a communication line of a first type, and the additional module is associated with a communication line of a second type, wherein at least one of the first type and the second type corresponds to a non-telephonic type of communication line.

15. A network interface device, comprising:

a base;

a cover attached to the base; and a first module secured within the base, the first module including terminations for at least one input communication line and at least one output communication line, wherein the base is configured to support at least one additional module in an area adjacent the first module, with at least one of the modules further including: (i) at least one termination for a power line separate from the input and output communication lines, and (ii) power protection circuitry for the corresponding power line.

* * * * *